United States Patent [19]

Asaga et al.

[11] Patent Number: 4,779,600
[45] Date of Patent: Oct. 25, 1988

[54] ENGINE

[76] Inventors: Ryuji Asaga, 2-107, Mihogaoka 1-chome 3, Nishiku, Kobe; Kouzo Asaga, 3-106, Furukawacho, Nishinomiyashi, Hyogo; Hidenori Yamamoto, 1-2, Kamirennjyaku, Mitakashi, all of Japan

[21] Appl. No.: 947,928

[22] Filed: Dec. 30, 1986

[51] Int. Cl.⁴ .................. F02M 25/06; F02D 9/02
[52] U.S. Cl. .................. 123/568; 123/325; 60/278
[58] Field of Search ........... 123/320, 323, 324, 325, 123/327, 332, 344, 315, 568, 569, 570; 60/276, 278

[56] References Cited

U.S. PATENT DOCUMENTS

| | | | |
|---|---|---|---|
| 1,476,942 | 12/1923 | Youngblood | 123/568 X |
| 1,489,411 | 4/1924 | Woolson | 123/568 X |
| 2,124,081 | 7/1938 | Rauen et al. | 123/323 |
| 3,165,096 | 1/1965 | Langdon | 123/323 |
| 3,347,217 | 10/1967 | Giorgio | 123/568 X |
| 3,918,420 | 11/1975 | Villella | 123/315 |

Primary Examiner—Willis R. Wolfe, Jr.
Attorney, Agent, or Firm—Frank C. Jordan; C. Bruce Hamburg; Manabu Kanesaka

[57] ABSTRACT

An engine used for automobiles, wherein the gases are discharged from the cylinder after purification, thereby reducing the air pollution problems, and the engine secures a strengthened engine brake by utilizing the pneumatic force as a restraint on the piston.

2 Claims, 7 Drawing Sheets

ENGINE

BACKGROUND OF THE INVENTION

1. Field of the Invention

The present invention relates to an engine, and more particularly to an engine used for automobiles, which is capable of discharging the working gases after purification, and which is capable of strengthening the engine brake.

2. Description of the Prior Art

It is known that exhaust gases discharged from automobiles contaminate air and provide public hazards. However it is unavoidable to some extent to discharge gases containing impurities hazardous to human health under the known automobile engines because of the fact that no effective device is equipped for purifying the gases before discharging from the cylinders.

When the automobile runs down a slope it is customary to minimize the speed of the engine so as to transmit the rotation of the wheels to the engine, thereby slowing down the rotation of the wheels. This prevents the brake shoes from becoming overheated owing to the tight contact with the wheels.

Herein this braking method will be referred to as engine brake. Under the known automobile engine systems the engine brake is effected by reducing the rotating speed of the engine but often it is not sufficient to brake the car. However there is a case where a strong engine brake must be effected.

OBJECTS AND SUMMARY OF THE INVENTION

The present invention is directed toward an engine capable of discharging gases from the cylinders after purification, and also achieving a strengthened engine brake.

Other objects and advantages of the present invention will become apparent from the detailed description given hereinafter; it should be understood, however, that the detailed description and specific embodiment are given by way of illustration only, since various changes and modifications within the spirits and scope of the invention will become apparent to those skilled in the art from this detailed description and drawings.

According to the present invention there is provided an engine used for automobiles, the engine comprising:

a gas outlet laterally produced in a side wall of the cylinder in which the piston is reciprocally moved, the gas outlet being on the level of the top surface of the piston reaching the lower dead center;

a mushroom-shaped valve movable in the gas outlet, the mushroom-shaped valve being adapted to open and close the opening of the gas outlet;

a gas purifying box including a gas filtering means, the gas purifying box being connected to the gas outlet through a duct;

an air cleaner case accepting the top portion of the gas purifying box;

a carburetor connected to the gas purifying box; and a change-over valve case provided under the carburetor, the valve case including a fuel port communicating with the carburetor, an air introducing port produced at right angle to the axis of the fuel port and a change-over valve movable therein, thereby introducing the air present on and above the top surface of the piston reaching the lower dead center into the cylinder through the air cleaner case and the gas purifying box.

DETAILED DESCRIPTION OF THE INVENTION

Figure 1:
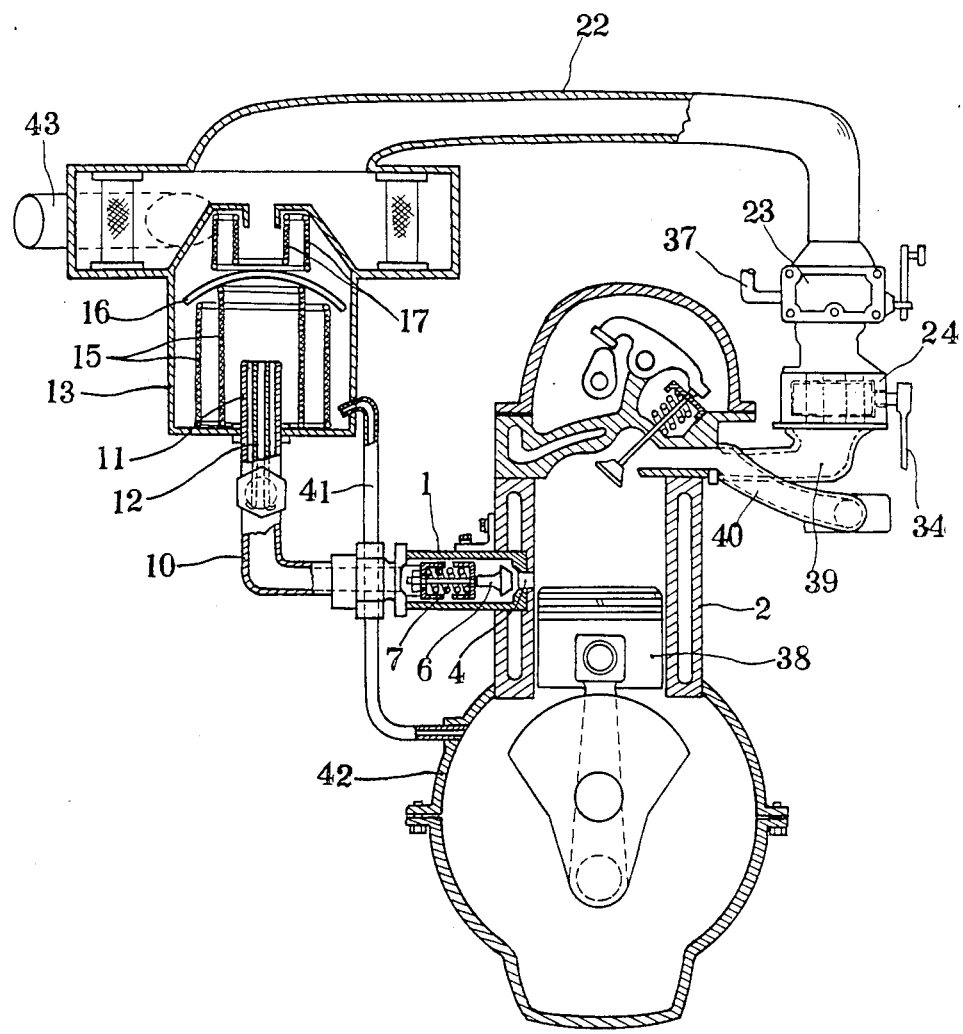
FIG. 1 is a vertical cross-section through an engine embodying the present invention.
Figure 2:
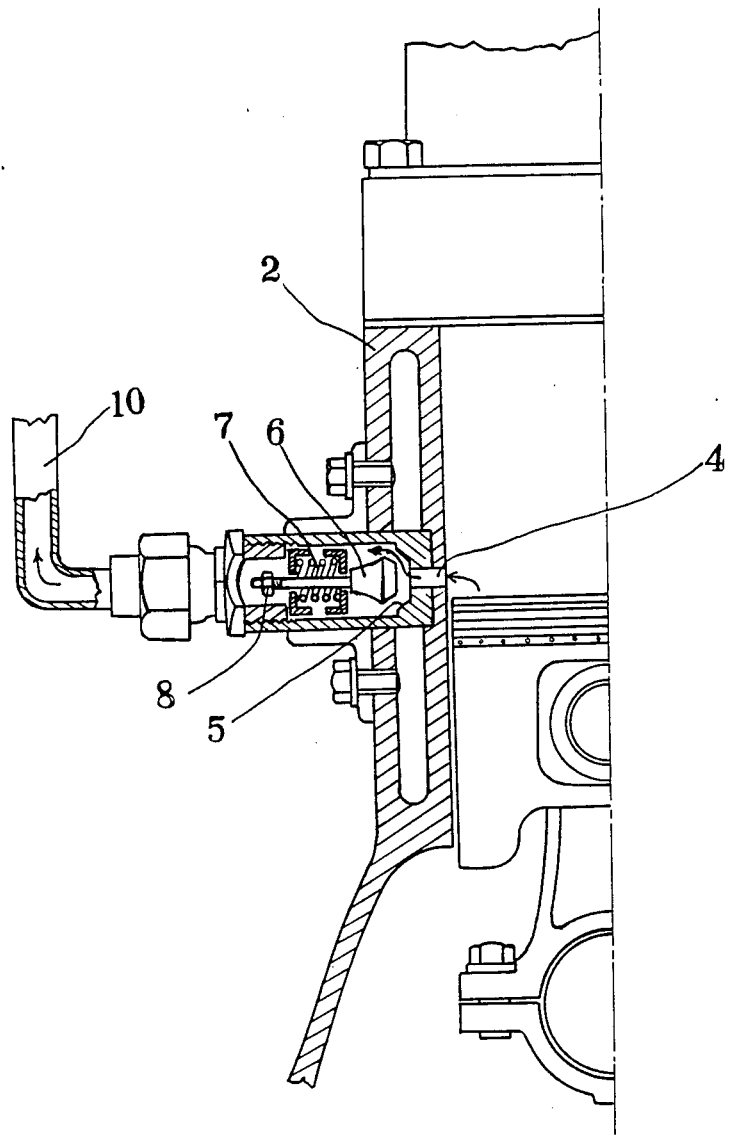
FIG. 2 is a vertical cross-section on an enlarged scale showing the gas outlet.
Figure 3:
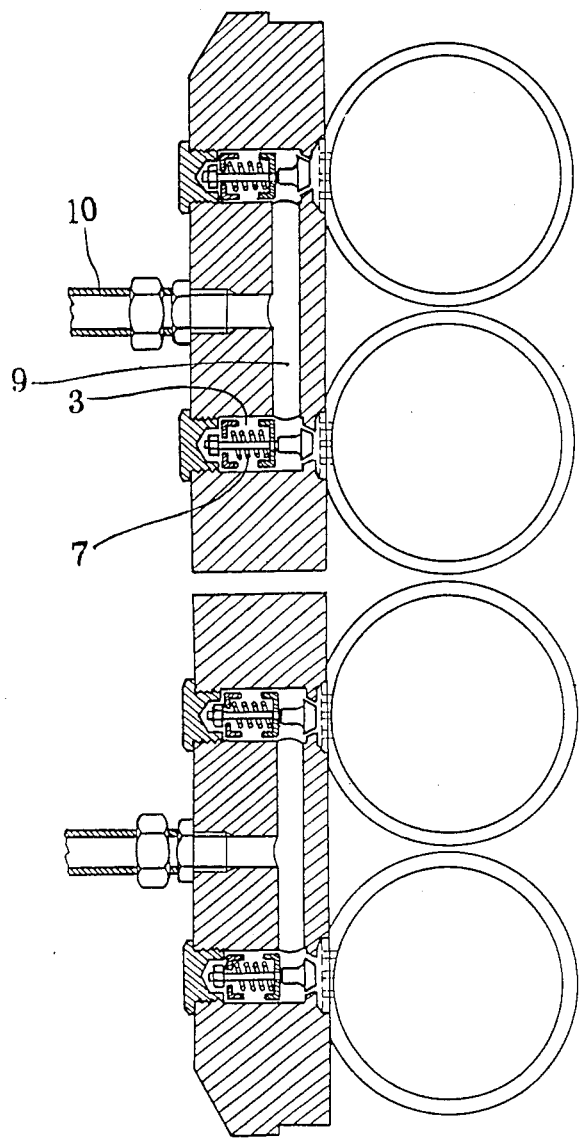
FIG. 3 is a horizontal cross-section on an enlarged scale showing the gas outlet.

There is provided a gas outlet 1 laterally fixed to each cylinder 2. The gas outlet includes a valve chamber 3 and a bore 4. The gas outlet 1 is fixed at a position at which the bore 4 is situated slightly above the top surface of a piston 38 when it comes down at the lowest position. The reference numeral 5 denotes a valve seat with which the head of a mushroom-shaped valve 6 comes into engagement. The valve 6 is normally biased toward the valve seat 5 by means of a spring 7, whose one end is fixed to the valve 6. The pressure of the spring 7 is adjusted by a nut 8 screwed to the shaft of the valve 6. The adjacent valve chambers 3 are communicated with each other through gas passageways 9. The reference numeral 10 denotes an exhaust gas outlet duct connected to the passageway 9 at one end, and to an air injector 11 at the other end.

Figure 4:
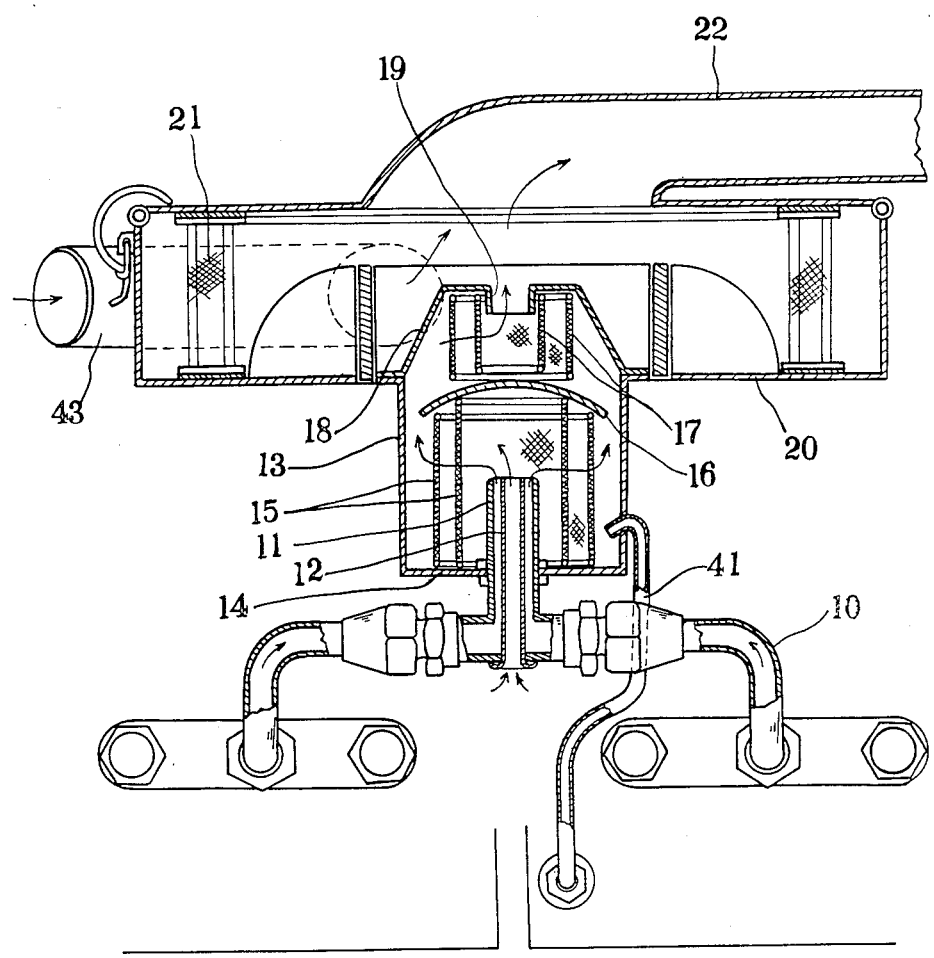
FIG. 4 is a vertical cross-section through the gas cleaning case shown in FIG. 1.
Figure 5:
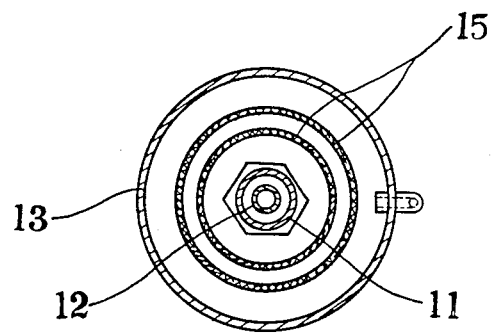
FIG. 5 is a horizontal cross-section showing the cleaning case.
Figure 6:
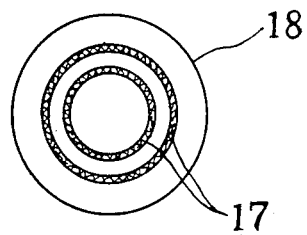
FIG. 6 is a horizontal cross-section through the upper oil purifying box.

The gas injector 11 is provided with a cylindrical air intake pipe 12. The gas injector 11 is open in a gas purifying box 13, that is, the air injector 11 is inserted through a bottom 14 of the box 13. The gas purifying box 13 is provided with a lower oil cleaner unit, which, in the illustrated embodiment, includes two cylinders 15 made of net. The reference numeral 16 denotes a dome-shaped oil distributor. In addition an upper oil cleaner unit 17 is provided, which also includes two cylinders 17 made of net. The gas purifying box 13 is provided with a covering dome 18, which has an opening 19 toward the upper oil cleaner unit 17. In this way the air purifying box 13 is unified with the upper and lower cleaner units and the covering dome 18, and as a unit the gas purifying box 13 is connected to an air cleaner case 20 in such a manner that the opening 19 is open therein as shown in FIG. 4. The air cleaner case 20 includes a cylindrical element 21 along its circumference.

Figure 7:
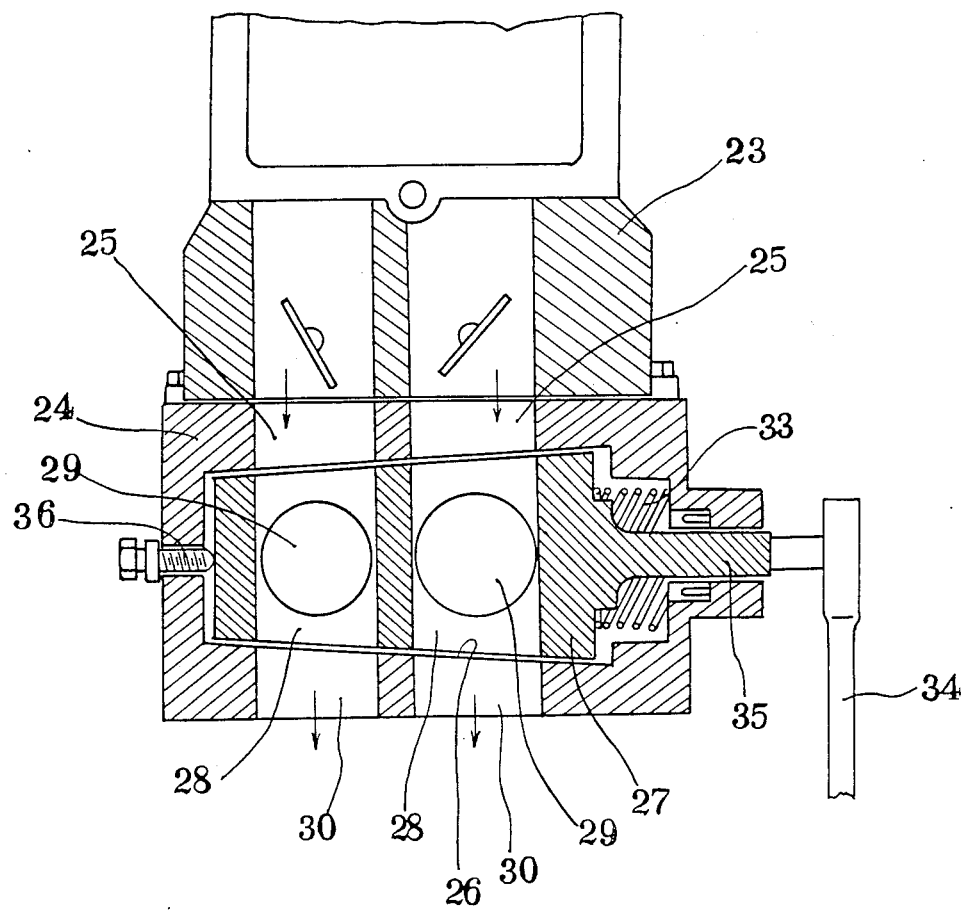
FIG. 7 is a vertical cross-section showing the change-over valve box.
Figure 8:
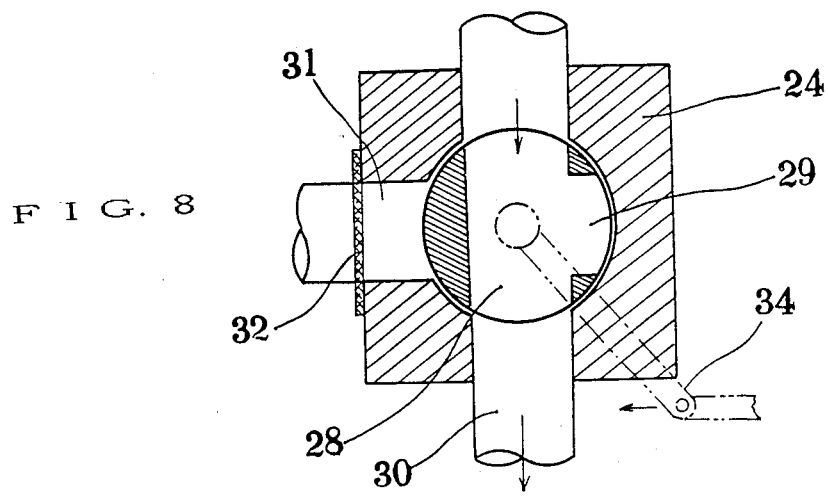
FIGS. 8 and 9 are cross-section showing the different aspects of operation of the change-over valve.
Figure 9:
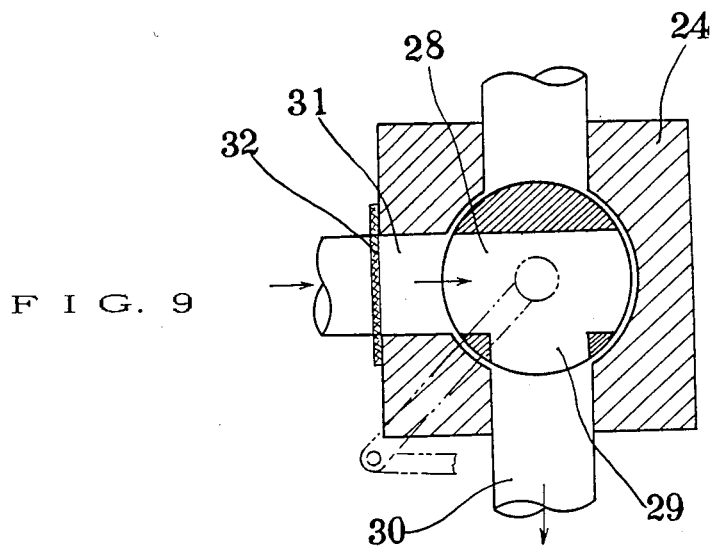

There is provided a duct 22 leading from the air cleaner case 20 to a carburettor 23 of a known type, under which a change-over valve box 24 is provided. The change-over valve box 24 includes fuel supply ports 25 connected to the carburettor 23. A change-over valve 27 is rotatively provided in a bore 26, the change-over valve 27 being shaped like a truncated cone. The change-over valve 27 is provided with air-fuel supply paths 28 produced axially in parallel, the fuel-air paths each being connected to the fuel supply ports 25. There are provided air paths 29 laterally produced at right angle to the paths 28. A fuel and air are supplied through fuel-air supply ports 30 produced in the change-over valve box 24, the ports 30 being aligned with the fuel supply ports 25. The change-over valve box 24 is provided with air intake ports 31 inserted through a side wall thereof at a position where they communicate with the air paths 29. The air intake ports 31 include cleaning filter unit 32. The change-over valve 27 is normally biased toward the larger diameter side of its own (in FIG. 7, to the right). The valve 27 is provided with a stem 35 and a handle 34. The reference numeral 36 denotes an adjusting screw engaging the smaller diameter side of the valve 27.

The carburettor 23 is supplied with fuel through a pipe 37. The reference numerals 38, 39 and 40 denote a piston, an inlet manifold connecting between the change-over valve box 24 and the cylinder 2, an exhaust manifold connected to the cylinder 2, respectively. The used oil is returned through an oil return pipe 41 connecting the gas purifying box 13 with a cylinder case 42. The air cleaner case 20 is provided with an air sucking pipe 43.

An example of the operation of the invention will be described:

For the explosion stroke the conventional exhaust valve is designed to open before the crank reaches the lower dead center (at about 50°), thereby allowing the gases to escape from the upper exhaust valve.

Under the present invention the exhaust valve is deliberately opened at a slightly later point of time (about 45°) before the lower dead center than that under the known engine so that the explosion is completely finished, and after it returns to its original state the gases are discharged through the upper exhaust valve. In this way the piston 38 reaches a point near the lower dead point, and pushes the valve 6 against the spring 7. At this stage the gases present in an upper section above the piston 38 (the gases being in the stage of incomplete combustion) is introduced into the outlet 1, and enters the gas purifying box 13 through the exhaust gas outlet duct 10 at a pressure at which air is introduced into the air intake pipe 12. The air is ejected and diffused in the oil cleaner 15 where the oil content in the gases is removed. The gases continues to rise up and enter the upper oil cleaning cylinder 17 in which the remaining oil content is removed. The gases free from the oil enters the air cleaner case 20 through the opening 19, and admixes with the air introduced therein. The mixture is then supplied into the carburettor 23 through the duct 22. Then it is supplied to the cylinder 2 through the inlet manifold 39 through the fuel path 28 of the change-over valve 27 via the fuel supply port 25.

Then the handle 34 is moved in the direction of arrow by hand or foot or under the action of electromagnetism, thereby rotating the valve 27 at right angle. As a result the fuel path 28 is rotated at right angle from the position where it communicates with the air supply port 25 and the fuel/air supply port 30. One open end of the bore 28 communicates with the air introducing port 31 which is open toward the side of the valve case 24.

The port 29 produced perpendicularly to the fuel path 28 communicates with the air/fuel supply port 30 which is open in the undersurface of the valve box 24. As a result the air free from impurities is introduced into the fuel/air supply port 30, and synchronously with it the fuel supply port 25 is closed by the side wall of the valve 27, thereby stopping the supply of fuel. In this way the air introduced through the air introducing port 31 is caused to enter the cylinder from above the cylinder 2 at the ascent of the piston. Under the known engines part of the fuel/air mixture is discharged outside in the state of incomplete combustion, which provides pollution problems in the society. In addition, the known engines have a difficulty in discharging the whole gases from the cylinder because the inlet valve starts to open at a point where the piston reaches 6 to 10 before the upper dead center.

In contrast, according to the present invention the exhaust valve is opened at a slightly later point of time than under the conventional engines, where it would be about 50° before the lower dead center. After the explosition has been fully achieved the exhaust valve is opened, thereby discharging the gases from above. At this stage the incomplete combustion gases are withdrawn from the cylinder, thereby reducing the pressure acting on the piston. The gases is cleaned and returned to the air cleaner case 20 for circulation through the carburettor 23. When the brake is to be applied while the car is running, the handle 34 is simply shifted in the direction of arrow, thereby stopping the supply of fuel. This enables a large amount of air to enter the cylinder 2 through the air introducing port 31, thereby providing a pneumatic restraint upon the piston. An strengthed engine brake is achieved.

While the car is running the idling is automatically effected by returning the handle 34 to its original position.

What is claimed is:

1. An engine system for an automobile, comprising,
   an engine body including at least one cylinder, at least one piston reciprocally moved inside the cylinder and having a top surface, gas introduce means for introducing gas into the cylinder, and has exhaust means for exhausting combusted gas outside the cylinder,
   a gas outlet device attached to the cylinder, said gas outlet device including a bore located adjacent to the top surface of the piston when the piston is located in a lower dead center, a valve situated adjacent to the bore for opening and closing the bore, and a spring to push the valve against the bore so that only when pressure inside the cylinder reaches above a predetermined level, the valve is moved against the spring to exhaust the gas inside the cylinder, said valve opening after gas in the cylinder combusted and only when the pressure of the combusted gas reached above the predetermined level so that unburned gas left above the piston is transferred through the gas outlet device,
   an air cleaner,
   a gas purifying device including a container situated inside the air cleaner, a duct disposed between the container and the bore to introduce the gas from the bore to the container, filter means situated inside the container for purifying the gas introduced from the cylinder, and an air intake pipe located in an end portion of the duct in the container so that fresh air and unburned gas are supplied to the filter means, and
   a carburetor situated between the air cleaner and the engine body for supplyng fuel and air to the engine body, said air including fresh air and exhaust air purified by the gas purifying device.

2. An engine system according to claim 1, further copmrising a change-over valve device situated between the carburetor and the engine body, said change-over valve device including a casing having a fuel port communicating with the carburetor and an air introducing port communicating with atmosphere, and a change-over valve situated inside the casing, said change-over valve having a path so that when a brake system of the automobile is actuated, the path operates to supply air to the engine body, and when the brake system is not actuated, mixture of gas and air from the carburetor is supplied to the engine.

* * * * *